United States Patent Office 3,573,196
Patented Mar. 30, 1971

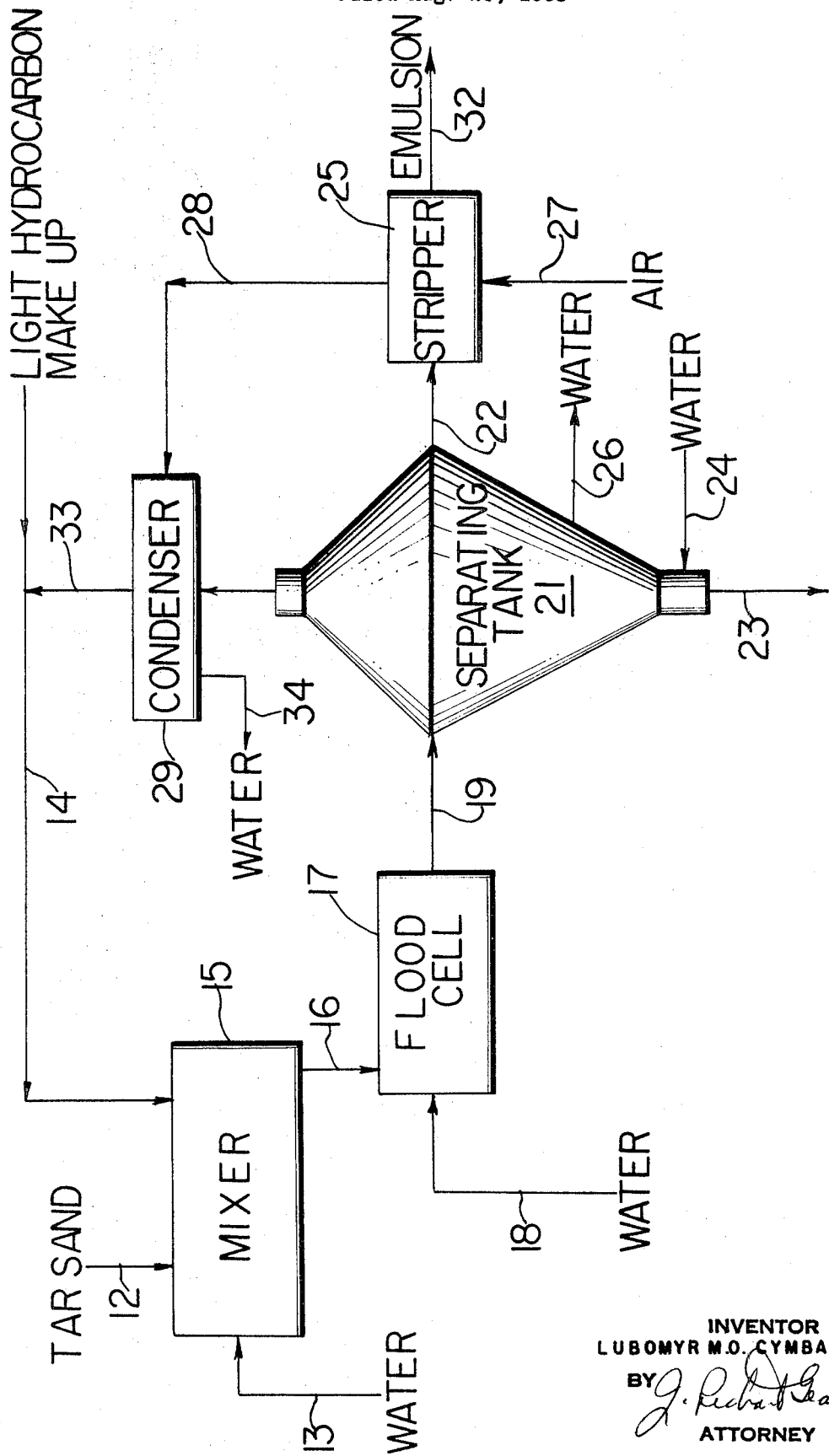

3,573,196
USE OF LIGHT HYDROCARBONS IN TAR SAND PROCESSING
Lubomyr M. O. Cymbalisty, Edmonton, Alberta, Canada, assignor to Cities Service Athabasca, Inc., Imperial Oil Limited, Atlantic Richfield Corporation, and Royalite Oil Company, Limited, a fractional part interest to each
Filed Aug. 28, 1968, Ser. No. 755,976
Int. Cl. C07q 1/04
U.S. Cl. 208—11                                    7 Claims

ABSTRACT OF THE DISCLOSURE

Bitumen is recovered from bituminous sand containing the same by forming a slurry of bituminous sand, water and normally liquid hydrocarbon material at a temperature below the boiling point of the hydrocarbon material. The slurry is then introduced into a body of water maintained at a temperature above the boiling point of the hydrocarbon material so that the hydrocarbon material evolves as a gas and aids in floating bitumen to the top of the water for recovery therefrom. The slurry is preferably formed at a temperature at least 10° F. below the boiling point of the hydrocarbon material, preferably between 80 and 140° F. while the body of water is preferably maintained at least about 10° F. above the boiling point of the hydrocarbon material, preferably between 140 and 210° F. $C_6$ hydrocarbons, such as normal or isohexane boiling between about 120 and about 160° F. are preferred. Pressure is preferably maintained relatively constant, i.e. with variations less than five p.s.i. throughout the process and atmospheric pressure is preferred for convenience.

---

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and the bitumen has an API gravity of about 8.0 degrees. This value for specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller-size mineral solid material is referred to as "fines." The fines contain clay and silt including some very small particles of sand. The fines content typically varies from about 5% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling in a body of water, to recover an emulsion, or froth, which contains some of the fines and quantities of coarse sand. Such as emulsion or froth is referred to herein as a bituminous emulsion.

One well-known method for preparing such emulsions is often referred to as the "hot-water process." In the hot-water process, the bituminous sand is slurried with steam and hot water and the pulp is then agitated with a stream of circulating hot water and carried to a separation cell maintained at an elevated temperature of about 180° F. In the separation cell, entrained air causes the bitumen to rise to the top of the cell in the form of an emulsion containing air, bitumen, water and mineral solids. The mineral solids are extremely difficult to separate from the bitumen and, unless the emulsion is further treated, it will about 5% to about 12% mineral solids and about 35% tuminous emulsion or froth can be subjected to water washing to effect a partial reduction in solids.

A bituminous emulsion, such as that obtained by the above-described procedures, often contains from about 10% to about 60% water, 5% to about 20% of mineral solids and from about 30% to about 85% bitumen. Usually, however, the bituminous emulsion or froth will contain, by weight, from about 25% to about 50% water, about 5% to about 12% mineral solids and from about 35% to about 70% of bitumen.

Separation of water and mineral solids from the bituminous emulsion is necessary for most ultimate uses of the bitumen. A number of methods have been proposed for breaking bituminous emulsions and recovering the bitumen. One such method involves the use of thermal dehydration followed by cycloning as described in U.S. Pat. 3,338,814 to R. A. Given et al.

The present invention involves forming a fluid slurry containing bituminous sand and normally liquid hydrocarbon material at a temperature below the boiling point of such hydrocarbon material and then introducing the slurry into a body of water maintained at a temperature above the boiling point of the hydrocarbon material so that the hydrocarbon material evolves as a gas and aids in floating bitumen to the top of the body of water for recovery therefrom.

The accompanying drawing is a diagrammatic illustration of a suitable arrangement of apparatus for carrying out a preferred embodiment of the invention.

In forming a slurry of bituminous sand in accordance with the invention, the liquid hydrocarbon may be introduced into the slurry during its formation or at some time subsequent to the formation of the slurry but prior to its introduction into the body of water in the separation zone. While the slurry may be formed and maintained at any suitable temperature, it is essential in practicing the invention that the slurry be at a temperature less than the boiling point of the hydrocarbon liquid when the hydrocarbon is added to the slurry. It is preferred that the slurry temperature be maintained lower than the boiling point of the hydrocarbon until it is introduced into the body of water in the separation zone. However, if precautions are taken to avoid escape of hydrocarbon vapors, it is possible to increase the temperature of the slurry to above the boiling point of the hydrocarbon at an earlier time, although some of the benefits of addition of the hydrocarbon may thereby be lost. The slurry is preferably maintained at a temperature which is at least 10° F. below the boiling point of the hydrocarbon material and preferably between about 80 and about 140° F. while the body of water into which the slurry is introduced for recovery of bitumen therefrom is preferably maintained at least about 10° F. above the boiling point of the hydrocarbon material, preferably between about 140 and about 210° F.

While any suitable pressures may be utilized, the process is normally carried out at atmospheric pressure in the mixing and separating steps in order to avoid the necessity for special pressurized or vacuum equipment. Other than temporarily higher pressures which may be produced in pumping materials within the process, the major processing steps are preferably carried out at pressures less than about 5 p.s.i. above or below atmospheric pressure and the pressure variation within the system is preferably maintained less than about 5 p.s.i.

Hydrocarbon materials suitable for use in forming the slurry described above preferably boil between about 95 and about 195° F. and those materials containing six carbon atoms per molecule and boiling between about 120 and about 160° F. are especially preferred. The use of hexane or one of the other $C_6$ hydrocarbons within this boiling range permits the use of temperatures which are conducive to most efficient recovery of bitumen from the bituminous sand for slurry formation and separation of bitumen in the body of water.

While it is possible to utilize hydrocarbon liquid of the type described above as the sole source of fluid for forming the fluid slurry of bituminous sand, it is generally preferred to form an aqueous slurry with the hydrocarbon material as an added component. While the water content of such slurry may vary widely, the slurry generally contains between about 15 and about 50 wt. percent water and preferably between about 15 and about 25 wt. percent water. Likewise, while widely varying amounts of hydrocarbon material may be used, amounts between about 0.5 and about 10 wt. percent based on the total amount of bitumen in the slurry are preferred.

A preferred method of forming the slurry for introduction into the body of hot water is by initially forming a slurry containing between about 15 and about 25 wt. percent water, between about 60 and about 75 wt. percent solids, between about 8 and about 10 wt. percent bitumen and in addition, between about .05 and about 1.0 wt. percent added liquid hydrocarbon material based on bitumen content of the slurry. The slurry is then flooded with additional water to bring the water content of the slurry introduced into the body of water for separation to between about 25 and about 50 wt. percent.

Referring now to the drawing, bituminous sand entering through a conduit 12, hot water entering through a conduit 13 and liquid hydrocarbon material entering through a conduit 14 are mixed in a mixer 15 to form a slurry. The aqueous slurry thus formed is at a temperature less than the boiling point of the hydrocarbon material introduced through the conduit 14. Temperature of this slurry may be controlled in any suitable manner, such as by the use of hot water or hot water and steam in forming the slurry.

From the mixer 15, the slurry may be passed through a conduit 16 to a flood cell 17 in which additional flooding water entering as through a conduit 18 is mixed with the slurry to increase the water content thereof. From the flood cell 17, the flooded slurry is passed through a conduit 19 to a separating tank 21 containing a body of hot water into which the slurry is introduced. The body of water in the separating tank 21 is maintained at a temperature above the boiling point of the hydrocarbon material added through the conduit 14 so that the hydrocarbon material is released as a gas to aid in flotation of bitumen to the top of the body of water. Aided by the release of hydrocarbon gas and the buoyant effect of air which is preferably entrained during the mixing step, the bitumen rises to the top of the water in the separating tank 21 and may be removed from the upper portion thereof in the form of a bituminous emulsion as through a conduit 22 while sand settles to the bottom and may be removed as through a conduit 23. As is conventional in such processes, water may be introduced through a conduit 24 to wash sand prior to its removal from the separating tank and a side stream of water may be removed through a conduit 26 and may, if desired be recycled to the mixing step or treated for recovery of bitumen or solids therefrom.

A portion of the hydrocarbon gas rising to the top of the body of water in the separating tank 21 may be dissolved in or entrained with the emulsion removed through the conduit 22. This gas may be recovered by passing the froth through an air stripper 25 wherein the gas is removed from the froth by air introduced as through a conduit 27. Recovered gas may be passed from the stripper 25 through a conduit 28 to a condenser 29 where the light hydrocarbon gas and any water vapor present is condensed. Stripped froth may be recovered through a conduit 32. Free gas not dissolved or entrapped in the emulsion may be collected and removed from the separating tank as through a conduit 31. This recovered gas may also be condensed in the condenser 29. Condensed light hydrocarbon may then be recycled as through a conduit 33 and the conduit 14 to the mixer 15. Light hydrocarbon makeup liquid may be introduced as needed through the conduit 14. Water may be allowed to settle and be removed from the condenser 29 via a conduit 34.

The emulsion recovered through the conduit 32 may, of course, be treated by any suitable means for recovery of bitumen therefrom and any of the light hydrocarbon material removed with the emulsion may, if desired, be recovered and recycled through the conduit 14 in liquid form for reuse in the process.

EXAMPLE

In this example, bituminous sand containing 11.75 wt. percent bitumen, 3.40 wt. percent water and 84.85 wt. percent solids is introduced into the mixer 15 at the rate of 120 lbs. per hour and is mixed with water introduced through the conduit 13 and normal hexane introduced in liquid form through the conduit 14 to form an aqueous slurry of bituminous sand containing 22.0 wt. percent water, 9.5 wt. percent bitumen, 68.3 wt. percent solids and containing in addition, 0.2 wt. percent hexane based upon the amount of bitumen present in the slurry. The slurry in the mixer 15 is formed at a temperature of 115° F. and at atmospheric pressure and is maintained under substantially these same conditions of temperature and pressure until it is introduced into the body of hot water in the separation zone for recovery of bitumen therefrom. From the mixer, the slurry is passed to the flood cell 17, wherein additional water is added to raise the water content of the slurry to 50 wt. percent. The flooded slurry is then passed to a body of hot water maintained at a temperature of 170° F. in the separating tank 21 to release the hexane from the slurry as a gas. The released hexane and entrained air thereupon acts to float bitumen to the top of the water in the form of bituminous emulsion which may be recovered as through the conduit 22 and contains 20 wt. percent water, 75 wt. percent bitumen, and 5 wt. percent solids. Some of the hexane appears in the vent gases from the separating tank 21 (conduit 27); the balance is recovered by air stripping. The combined light hydrocarbon gases are condensed to liquid form and recycled as through the conduit 14 for reuse in the process. In this example, no water is added through the conduit 24, nor is any water removed through the conduit 26. The tailings removed as through the conduit 23 contain over 99 wt. percent of the original feed solids, and the balance of the water.

While the invention has been described above, with reference to preferred embodiments thereof, it will be understood by those skilled in the art that various changes and modifications may be made without departing from the spirit and scope of the invention and it is intended to cover all such changes and modifications in the appended claims.

I claim:
1. The process for the recovery of bitumen from bituminous sand containing the same which comprises forming a fluid slurry containing such bituminous sand and light hydrocarbon material at a temperature below the boiling point of the light hydrocarbon material and then introducing said slurry into a body of water maintained at a temperature above the boling point of such hydrocarbon material, whereby the hydrocarbon material evolves as a gas and bitumen floats to the top of the body of water for recovery therefrom.

2. The process of claim 1 in which the slurry is formed at a temperature at least about 10° F. below the boiling point of the hydrocarbon material and the body of water is maintained at least about 10° F. above the boiling point of the hydrocarbon material.

3. The process of claim 2 in which the slurry is formed at a temperature between about 80 and about 140° F. and the body of water is maintained at a temperature between about 140 and about 210° F.

4. The process of claim 3 in which the hydrocarbon material has a normal boiling point between about 95 and abount 195° F.

5. The process of claim 4 in which the hydrocarbon material is one containing six carbon atoms per molecule and having a normal boiling point between about 120 and about 160° F.

6. The process of claim 5 wherein the process is operated at a substantially constant pressure.

7. The process of claim 1 in which the slurry is an aqueous slurry containing between about 0.5 and about 10 wt. percent light hydrocarbon material based on the amount of bitumen in the slurry.

References Cited

UNITED STATES PATENTS 2,965,557   12/1960   Price _____ 208—11

CURTIS R. DAVIS, Primary Examiner